(12) United States Patent
Volker (10) Patent No.: US 6,562,394 B1
(45) Date of Patent: May 13, 2003

(54) FLOWABLE NONDIGESTIBLE OIL AND PROCESS FOR MAKING

(75) Inventor: David Alan Volker, North Bend, OH (US)

(73) Assignee: The Procter & Gamble Co., Cincinnati, OH (US)

( * ) Notice: Subject to any disclaimer, the term of this patent is extended or adjusted under 35 U.S.C. 154(b) by 0 days.

(21) Appl. No.: 09/424,185

(22) PCT Filed: May 20, 1998

(86) PCT No.: PCT/US98/10325

§ 371 (c)(1),
(2), (4) Date: Nov. 19, 1999

(87) PCT Pub. No.: WO98/52429

PCT Pub. Date: Nov. 26, 1998

(51) Int. Cl.⁷ .................................................. A23D 9/04
(52) U.S. Cl. ........................ 426/606; 426/611; 426/612; 524/57; 524/58; 524/310; 524/311
(58) Field of Search ................................ 426/606, 611, 426/612; 524/57, 58, 310, 311

(56) References Cited

U.S. PATENT DOCUMENTS

| | | |
|---|---|---|
| 2,482,761 A | 9/1949 | Goebel |
| 2,731,481 A | 1/1956 | Harrison et al. |
| 2,793,219 A | 5/1957 | Barrett et al. |
| 2,831,854 A | 4/1958 | Tucker et al. |
| 2,962,419 A | 11/1960 | Westfield |
| 3,353,967 A | 11/1967 | Lutton |
| 3,579,548 A | 5/1971 | Whyte |
| 3,600,186 A | 8/1971 | Mattson et al. |
| 3,914,452 A | 10/1975 | Norris |
| 3,932,532 A | 1/1976 | Hunter et al. |
| 3,943,259 A | 3/1976 | Norris |
| 3,963,699 A | 6/1976 | Rizzi et al. |
| 4,005,195 A | 1/1977 | Jandacek |
| 4,034,083 A | 7/1977 | Mattson |
| 4,234,606 A | 11/1980 | Gawrilow |
| 4,239,786 A | 12/1980 | Gilmore et al. |
| 4,335,157 A | 6/1982 | Varvil |
| 4,359,482 A | 11/1982 | Crosby |
| 4,368,213 A | 1/1983 | Hollenbach et al. |
| 4,391,838 A | 7/1983 | Pate |
| 4,455,333 A | 6/1984 | Hong et al. |
| 4,461,782 A | 7/1984 | Robbin et al. |
| 4,508,746 A | 4/1985 | Hamm |
| 4,517,360 A | 5/1985 | Volpenhein |
| 4,518,772 A | 5/1985 | Volpenhein |
| 4,582,715 A | 4/1986 | Volpenhein |
| 4,582,927 A | 4/1986 | Fulcher |
| 4,797,300 A | 1/1989 | Jandacek et al. |
| 4,840,815 A | 6/1989 | Meyer et al. |
| 4,861,613 A | 8/1989 | White et al. |
| 4,888,195 A | 12/1989 | Huhn et al. |
| 4,961,951 A | 10/1990 | Crosby |
| 4,983,329 A | 1/1991 | Cooper |
| 5,175,323 A | 12/1992 | Cooper |
| 5,211,981 A | 5/1993 | Purves et al. |
| 5,236,733 A | 8/1993 | Zimmerman et al. |
| 5,268,191 A | 12/1993 | Crosby |
| 5,273,772 A | 12/1993 | Cooper |
| 5,288,884 A | 2/1994 | Cooper |
| 5,298,637 A | 3/1994 | Cooper |
| 5,304,665 A | 4/1994 | Cooper et al. |
| 5,306,514 A | 4/1994 | Letton et al. |
| 5,306,515 A | 4/1994 | Letton et al. |
| 5,362,894 A | 11/1994 | Handwerker et al. |
| 5,374,446 A | 12/1994 | Ferenz et al. |
| 5,387,429 A | 2/1995 | Cooper |
| 5,399,728 A | 3/1995 | Cooper |
| 5,399,729 A | 3/1995 | Cooper et al. |
| 5,419,925 A | 5/1995 | Seiden et al. |
| 5,422,131 A | 6/1995 | Elsen et al. |
| 5,427,815 A | 6/1995 | Ferenz |

(List continued on next page.)

FOREIGN PATENT DOCUMENTS

| | | |
|---|---|---|
| EP | 0 322 027 | 6/1989 |
| EP | 0 325 010 | 7/1989 |
| EP | 0 375 027 | 6/1990 |
| EP | 0375027 | * 6/1990 |
| EP | 0 571 219 | 11/1993 |
| EP | 0 667 105 | 8/1995 |
| WO | 92/18015 | 10/1992 |
| WO | 93/00823 | * 1/1993 |
| WO | 94/09638 | * 5/1994 |
| WO | 94/09641 | * 5/1994 |
| WO | 97/22260 | 6/1997 |
| WO | 98/52428 | 11/1998 |
| WO | 98/52429 | 11/1998 |

OTHER PUBLICATIONS

J. Amer. Oil Chem. Soc., vol. 55 (1978), pp. 328–331.
Hoffman, Robert—The Modulation Contrast Microscope: Principles and Performances, Journal of Microscopy, vol. 110, Pt 3, Aug. 1977, pp. 205–222.

*Primary Examiner*—Patricia A. Short
(74) *Attorney, Agent, or Firm*—Karen F. Clark; Erich D. Hemm; Melody A. Jones (57) ABSTRACT

A flowable nondigestible oil composition having a Consistency in a temperature range of 20° C. to 40° C. of less than about 600 P.sec$^{(n-1)}$, preferably less than about 400 P.sec$^{(n-1)}$. The flowable nondigestible oil contains a liquid polyol polyester having a complete melt point less than 37° C., and a solid polyol polyester having a complete melt point of at least about 37° C. The solid polyol polyester can be a solid saturated polyol polyester, a solid diversely esterified polyol polyester, a polyol polyester polymer, or a combination thereof, which are crystallized, or co-crystallized, into unaggregated crystal particles of typically less than 10 microns in maximum dimension. The flowable nondigestible oil is made by a process which includes the steps of melting completely the nondigestible oil, crystallizing the solid polyol polyester while applying shear to avoid formation of clusters of crystallized aggregates which can prevent the composition from being flowable. A preferred equipment for crystallizing the solid polyol polyester to form the flowable composition is a scraped wall heat exchanger.

20 Claims, 1 Drawing Sheet

U.S. PATENT DOCUMENTS

| | | |
|---|---|---|
| 5,451,416 A | 9/1995 | Johnston et al. |
| 5,466,843 A | 11/1995 | Cooper |
| 5,512,313 A | 4/1996 | Cooper et al. |
| 5,516,544 A | 5/1996 | Sekula et al. |
| 5,589,217 A | 12/1996 | Mazurek |
| 5,597,605 A | 1/1997 | Mazurek |
| 5,603,978 A | 2/1997 | White et al. |
| 5,641,534 A | 6/1997 | White et al. |

* cited by examiner

FLOWABLE NONDIGESTIBLE OIL AND PROCESS FOR MAKING

FIELD OF THE INVENTION

This invention relates to a nondigestible oil containing a solid nondigestible oil component, which can flow at ordinary and ambient storage temperatures, and to a process for making the flowable nondigestible oil.

BACKGROUND ART

Numerous patents have been directed to providing materials which have the physical and gustatory characteristics of triglyceride fats, but which are absorbed to a low extent or not at all by the body. These materials are referred to variously as noncaloric fats, pseudofats, nondigestible fats and fat substitutes. Patents pertaining to such materials include U.S. Pat. No. 4,582,927. Fulcher, issued Apr. 15, 1986, (fatty esters of malonic acid); U.S. Pat. No. 4.582,715. Volpenhein, issued Apr. 15, 1986, (alpha acetylated triglycerides); and U.S. Pat. No. 3,579,548, Whyte, issued May 18, 1981. (triglycerides of alpha-branched chain carboxylic acids).

One particular type of compound which has achieved considerable attention as a nondigestible fat is sucrose polyester (i.e., sucrose in which at least four of the eight hydroxyl groups are esterified with a fatty acid). U.S. Pat. No. 3,600,186, Mattson, issued Aug. 17, 1971; U.S. Pat. No. 4,368,213, Hollenbach et al. issued Jan. 11, 1983; and U.S. Pat. No. 4,461,782, Robbins et al. issued Jul. 24, 1984 describe the use of this material as a nondigestible fat in a variety of food compositions.

A problem associated with use of liquid nondigestible oils, i.e., those having a melting point below body temperature (about 37° C.), is an undesired passive oil loss effect, which is manifested in leakage of the liquid nondigested fat through the gastrointestinal tract's anal sphincter. Regular ingestion of moderate to high levels of completely liquid forms of these polyol polyesters can produce this passive oil loss. U.S. Pat. No. 4,005,195, Jandacek, issued Jan. 25, 1977, discloses the combining of higher melting fatty materials such as solid triglycerides and solid sucrose polyesters with the liquid sucrose polyesters in order to control oil loss.

U.S. Pat. No. 4,797,300 (Jandacek et al.), issued Jan. 10, 1989 discloses the use of certain solid sucrose polyesters which have high oil binding capacity for liquid sucrose polyesters (SPE) and liquid triglycerides, when used at levels of about 10% to 25% in said oils. It is disclosed that because of their high oil binding capacity, these solid sucrose polyesters have outstanding utility as agents to prevent passive oil loss of liquid nondigestible sucrose polyesters, and they are also useful as non-caloric hardstocks to use with liquid digestible or nondigestible oils in the preparation of semi-solid fat products such as shortenings and margarines. The oil binding agents of the Jandacek et al. '300 patent are solid sucrose polyesters wherein the ester groups consist essentially of a mixture of short chain saturated fatty acid ester radicals ($C_2$–$C_{10}$) and long chain saturated fatty acid radicals ($C_{20}$–$C_{24}$) in a molar ratio of short chain to long chain of from about 3:5 to about 5:3, and wherein the degree of esterification is from about 7 to about 8. Jandacek et al. also disclose plastic shortening and other food compositions containing 10–25% of the solid SPE.

U.S. Pat. No. 4,005,195 (Jandacek), issued Jan. 25, 1977 describes a means of preventing the undesirable oil loss effect through the addition of the polyesters as oil-loss control agents. The oil-loss control agents include solid fatty acids (melting point 37° C. or higher) and their triglyceride sources, and solid polyol fatty acid polyesters. Specifically $C_{10}$–$C_{22}$ saturated fatty acid polyesters are said to be useful at levels of at least 10%, preferably at least 20%.

U.S. Pat. No. 5,306,514 (Letton et al.), issued Apr. 26, 1994, discloses edible oil compositions containing a) a liquid nondigestible oil having a complete melting point below about 37° C. and b) a solid polyol fatty acid polyester having a complete melting point above about 37° C., wherein the weight ratio of b) to a) is from about 1:99 to about 9:91. The solid polyol fatty acid polyester consists of (i) a polyol having at least about 4 hydroxyl groups, wherein at least about 4 of the hydroxyl groups of the polyol are esterified, and (ii) ester groups comprised of (a) fatty acid radicals selected from the group consisting of $C_{12}$ or higher unsaturated fatty acid radicals, $C_2$–$C_{12}$ saturated fatty acid radicals, or mixtures thereof, and (b) $C_{20}$ or higher saturated fatty acid radicals, at a molar ratio of (a):(b) being from about 1:15 to about 1:1. In the solid polyol polyester at least 15% by weight of the fatty acid radicals $C_{20}$ or higher saturated fatty acid radicals. Further, the slope of the SFC profile of the mixture of a) and b) between 37° C. and 21.1° C. is between 0 and about –0.75.

U.S. Pat. No. 5,306,515 (Letton et al.), issued Apr. 26, 1994, discloses pourable compositions containing a solid polyol fatty acid polyester, having a complete melting point above about 37° C., a liquid nondigestible oil having a complete melting point below about 37° C., less than about 90% by weight of a digestible oil having less than 5% solids at 21° C.; and less than 10% hardstock; wherein the ratio of (A) to (B) is from about 1:99 to about 9:91 and wherein the pourable composition has a yield point of not more than about 100 dynes/cm$^2$. The solid polyol fatty acid polyester consists of (i) a polyol having at least about 4 hydroxyl groups, wherein at least about 4 of the hydroxyl groups of the polyol are esterified, and (ii) ester groups comprised of (a) fatty acid radicals selected from the group consisting of $C_{12}$ or higher unsaturated fatty acid radicals, $C_2$–$C_{12}$ saturated fatty acid radicals or mixtures thereof, and (b) $C_{20}$ or higher saturated fatty acid radicals at a molar ratio of (a):(b) being from about 1:15 to about 2:1. In the solid polyol polyester at least 15% by weight of the fatty acid radicals are $C_{20}$ or higher saturated fatty acid radicals. Further, the slope of the SFC profile of the mixture of (A) and (B) between 37° C. and 21.1° C. is between 0 and about –0.75, and the combined level of (A) and (B) in said composition is at least 10% by weight. Examples include compositions containing 65 wt. % liquid digestible triglyceride oil.

It is an object of the present invention to provide a flowable nondigestible oil composition containing a solid at ambient temperature which is flowable at ordinary and ambient temperatures, and which can subsequently be used as an edible nondigestible oil providing good passive oil loss control and good organoleptic properties to foods prepared with them.

SUMMARY OF THE INVENTION

A flowable nondigestible oil composition of the present invention comprises a) a liquid polyol fatty acid polyester having a complete melt point less than 37° C., and b) a solid polyol fatty acid polyester having a complete melt point of at least about 37° C. The flowable nondigestible oil has a Consistency (K) within the temperature range of 20–40° C. of less than about 600 P.sec$^{(n-1)}$, where K is determined from a power law model fit of the apparent viscosity versus shear rate data (see Analytical Method Section), and n is the shear index (dimensionless). Preferably, the flowable nondigestible oil has a Consistency of less than about 400 P.sec$^{(n-1)}$ at a temperature range of 20–40° C. The flowable nondigestible oil composition contains the solid polyol fatty acid polyester in the form of small crystal particles, typically having a largest dimension of less than about 30 microns, preferably less than about 10 microns, more preferably between 1 and 30 microns, even more preferably between 1 and 10 microns, and most preferably of about 2 to about 5 microns.

The present invention also provides a process for making a flowable nondigestible oil, wherein the nondigestible oil comprises a) a liquid polyol fatty acid polyester having a complete melt point less than 37° C., and b) a solid polyol fatty acid polyester having a complete melt point of at least about 37° C. The process comprises the steps of melting completely the nondigestible oil composition containing the solid polyol fatty acid polyester, rapidly cooling the melted nondigestible oil to a crystallization temperature, thereby rapidly crystallizing at least a substantial portion of the solid polyol fatty acid polyester, and shearing the nondigestible oil composition during the step of crystallizing to form the flowable nondigestible oil composition. Optionally, following the crystallizing and shearing steps, the process can include the step of tempering the crystallized nondigestible oil composition for a time sufficient to substantially completely crystallize all of the solid polyol fatty acid polyester, the step of adding a stabilizing amount of a diluent liquid, typically a liquid polyol fatty acid polyester, to the crystallized nondigestible oil composition, or both steps.

These compositions are capable of being stored in a flowable state at ambient and ordinary storage temperatures. Storage at ambient and ordinary temperature avoids exposure of the composition to high temperatures (generally greater than 50° C.) usually associated with storage and handling of the nondigestible oil composition in a molten form. Making and storing the nondigestible oil in a flowable form allows the nondigestible oil to be easily handled at ambient handling and storage temperatures, which minimizes the effect of heat and high temperature on the chemical stability of the polyol fatty acid polyester. This results in greater oxidative and flavor stability during extended storage of the nondigestible oil and of food products containing the nondigestible oil. This is particularly advantageous when the liquid polyol fatty acid polyester component of the nondigestible oil is made from an un hardened (non-hydrogenated) source oil, such as unhardened cottonseed oil. In addition, the flowable nondigestible oil of the present invention can be utilized as a carrier for the application or incorporation of ingredients to foods products, such as flavorings, seasonings, and vitamins.

DEFINITIONS

As used herein the term "nondigestible" shall mean being absorbable to an extent of only 70% or less (especially 20% or less) by the human body through its digestive system.

As used herein, the term "flowable" refers to ability of a composition to be transported by gravity or by conventional mechanical or pneumatic pumping means from a storage vessel.

As used herein the term "ambient" shall mean a temperature which is less than the lowest onset crystallization temperature of a solid polyol fatty acid polyester in the nondigestible oil composition.

As used herein, the term "food" refers to any manner of viand for usage by man. "Food" may further include individual food components or mixtures thereof.

As used herein, the term "comprising" means various components can be conjointly employed in the fat compositions of the present invention. Accordingly, the term "comprising" encompasses the more restrictive terms "consisting essentially of" and "consisting of".

All percentages and proportions herein are by weight unless otherwise specified.

DETAILED DESCRIPTION OF THE INVENTION

High temperatures and exposure to oxygen can result in thermal and oxidative composition of the nondigestible oil composition. It is preferred to avoid storage and handling of the nondigestible oil at the higher temperatures provided in heated railway cars and production tanks, which are needed to maintain the nondigestible oil in a molten state.

Consequently, there is a significant advantage to store and transport the nondigestible oil at lower, ambient temperatures, and in the absence of oxygen, to inhibit or reduce thermal and oxidative degradation of the nondigestible oil composition, to improve the quality of the nondigestible oil composition and the foods prepared therewith, and to require less expensive and less complicated transportation and storage requirements for the nondigestible oil composition. Generally, the ambient temperature at which the flowable nondigestible oil of the present invention would be stored is from about 5° C. to about 50° C., and more preferably from about 20° C. to about 40° C.

To commercially process the nondigestible oil economically and in large quantities, there is a need for a rapid process to make a flowable nondigestible oil composition which can be handled and stored at ambient temperature. Typically such a process would convert the nondigestible oil into a flowable nondigestible oil at ambient conditions in less than 2 hours, preferably in less than one hour, and more preferably in less than 30 minutes. For commercial reasons, the flowable nondigestible oil composition of the present invention should have good flow properties, such that the flowable nondigestible oil will drain sufficiently, preferably substantially completely, by the force of gravity from the inside of transportation vessels, such as railway cars, and manufacturing containers, such as tanks. Preferably, the flowable nondigestible oil composition of the present invention generally will not adhere in a mass to the side walls and other surfaces inside the railway cars or tanks. That is, the flowable nondigestible oil will typically drain such that only a relatively thin layer or film of the nondigestible oil will remain on the inside surfaces of a vessel or tank. Preferably, the flowable nondigestible oil is stable during extended storage; that is, it remains flowable and there is minimal and preferably no separation or settling of the solid crystals.

A. Composition of Flowable Nondigestible Oil

A flowable nondigestible oil composition comprising a solid polyol fatty acid polyester having a complete melting point of at least about 37° C. and a liquid polyol fatty acid polyester having a complete melting point of less than about 37° C., can be prepared which is flowable at ambient storage temperatures, and can, upon further processing including remelting completely the solid polyol fatty acid polyester, provide good passive oil loss control and organoleptic properties (i.e. good mouthfeel) to foods prepared therewith. The flowable nondigestible oil composition of the present invention generally comprises about 50% to about 99%, more preferably about 80% to 97%, and most preferably about 85% to 95%, of the liquid polyol fatty acid polyester. The flowable nondigestible oil composition of the present invention generally comprises about 1% to 50%, more preferably about 3% to 20%, and most preferably about 5% to 15%, of the solid polyol fatty acid polyester.

The flowable nondigestible oil composition generally has a Consistency of less than 600 $P.sec^{(n-1)}$ in a temperature range of from 20–40° C. The flowable nondigestible oil composition will have a Consistency of preferably less than about 400 $P.sec^{(n-1)}$, more preferably less than about 200 $P.sec^{(n-1)}$, and most preferably less than about 100 $P.sec^{(n-1)}$, in a temperature range of 20–40° C.

Mixtures of solid polyol polyesters of the invention with liquid nondigestible oils are further characterized in having a relatively flat solids content profile across the temperature range of from typical room temperature to body temperature, i.e., from about 21.1° C. (70° F.) to about 37° C. (98.6° F.). The slope of the SFC profile is expressed as the change in percent solids per unit change in temperature, in ° F. Typically the slope of the Solid Fat Content (SFC) profile between these temperatures is between 0 and −0.75. Generally, the greater the weight percent of $C_{20}$ or higher saturated fatty acid radicals in the solid polyol polyester, the flatter the SFC profile slope will be. For example, at the 30% $C_{20}$ or higher fatty acid level the slope will typically be between 0 and −0.5, and at 50% it will typically be between 0 and −0.3.

Determination of SFC values over a range of temperatures can be done by a method involving PNMR (Pulsed Nuclear Magnetic Resonance). Such method is well known to those skilled in the art (see *J. Amer. Oil Chem. Soc.*, Vol. 55 (1978), pp. 328–31, and A.O.C.S. Official Method Cd. 16–81, *Official Methods and Recommended Practices of The American Oil Chemists Society*, 3rd. Ed., 1987; both incorporated herein by reference).

1. Solid Polyol Fatty Acid Polyester

The solid polyol fatty acid polyester of the present invention will have a complete melt point of at least 37° C., which is the ordinary body temperature, and more preferably of at least 50° C., and most preferably of at least 60° C., and less than 500° C. Preferably, the solid polyol fatty acid polyester is selected from (i) a solid saturated polyol polyester, (ii) a solid diversely esterified polyol polyester, (iii) a polyol polyester polymer, and (iv) combinations thereof.

The polyols which are used in the solid polyol polyester compounds of the present invention preferably contain from about 4 to about 12, more preferably 4 to 8, most preferably 6 to 8, hydroxyl groups. Examples of preferred polyols are sugars (including monosaccharides and disaccharides and trisaccharides) and sugar alcohols, containing from 4 to 11 hydroxyl groups. The trisaccharides raffinose, and maltotriose are examples of sugars which contain 11 hydroxyl groups. The preferred sugars and sugar alcohols are those which contain 4 to 8, more preferably 6 to 8, hydroxyl groups. Examples of those containing four hydroxyl groups are the monosaccharides xylose and arabinose and the sugar alcohol erythritol. Suitable five hydroxyl group-containing polyols are the monosaccharides galactose, fructose, mannose and glucose, and the sugar alcohol xylitol. A polyol containing six hydroxyl groups is sorbitol. Examples of disaccharide polyols which can be used include maltose, lactose, and sucrose, all of which contain eight hydroxyl groups. Examples of other suitable polyols are pentaerythritol, diglycerol, triglycerol, alkyl glycosides, and polyvinyl alcohols. The preferred polyol is sucrose.

The average degree of esterification of the solid polyol fatty acid polyesters is of at least 4 ester groups, i.e., at least 4 of the hydroxyl groups of the polyol are esterified with fatty or other organic acids. Polyol esters that contain 3 or less ester groups are generally digested in (and the products of digestion are absorbed from) the intestinal tract much in the manner of ordinary triglyceride fats or oils, whereas those polyol esters which contain 4 or more ester groups are generally substantially nondigestible and consequently nonabsorbable by the human body. It is not necessary that all of the hydroxyl groups of the polyol be esterified, but it is preferable that disaccharide molecules contain no more than 3 unesterified hydroxyl groups, and more preferably no more than 2 unesterified hydroxyl groups, so that they are rendered nondigestible. Typically, substantially all (e.g., at least about 85%) of the hydroxyl groups of the polyol are esterified, preferably at least about 95% of the hydroxyl groups of the polyol are esterified. In the case of sucrose polyesters, typically from about 7 to 8 of the hydroxyl groups of the polyol are esterified.

In one preferred composition, the solid polyol fatty acid polyester comprises (i) a solid saturated polyol polyester, and (ii) a solid diversely esterified polyol polyester, the ratio of (i):(ii) being from about 1:20 to about 4:1.

i) Solid Saturated Polyol Polyester

The solid saturated polyol polyester comprises esters of essentially only, and preferably only, long chain saturated fatty acid radicals which are typically normal and contain at least 14, preferably 14 to 26, and more preferably 16 to 24, and most preferably from 20 to 24, carbon atoms. Particularly preferred are saturated fatty acid radicals of 22 carbon atoms. The long chained saturated radicals can be used in combination with each other in all proportions. The average degree of esterification of these solid saturated polyol polyesters is such that at least 4 of the hydroxyl groups of the polyol are esterified. In the case of sucrose polysaturate esters, from about 7 to 8 of the hydroxyl groups of the polyol are preferably esterified. Typically, substantially all (e.g., at least about 85% preferably at least about 95%) of the hydroxyl groups of the polyol are esterified.

Examples of suitable long chain saturated fatty acid radicals include tetradecanoate (myristate), hexadecanoate (palmitate), octadecanoate (stearate), elcosanoate (arachidate), docosanoate (behenate), tetracosanate (lignocerate), and hexacosanoate (cerotate). Mixed fatty acid radicals from completely or substantially completely hydrogenated vegetable oils which contain substantial amounts of the desired long chain saturated fatty acids can be used as sources of fatty acid radicals in preparing the solid polyol polyesters useful in the present invention. The mixed fatty acids from such oils should preferably contain at least about 30% (more preferably at least about 50%, most preferably at least about 80%) of the desired long chain saturated fatty acids. Suitable source oils include completely or substantially completely hydrogenated soybean oil, cottonseed oil, palm oil, peanut oil, corn oil, safflower oil, sunflower oil, sesame oil, low erucic acid rapeseed oil (i.e. canola oil), and high erucic acid rapeseed oil. These oils are typically hydrogenated to an Iodine Value of about 12 or less, and preferably to an Iodine Value of about 8 or less.

Examples of solid polyol polyesters useful as hardstocks in the fat compositions of the present invention include sucrose octabehenate, sucrose octastearate, sucrose octapalmitate, sucrose heptastearate, xylitol, pentastearate, galactose pentapalmitate, and the sucrose hepta- and octaesters of soybean oil and high erucic acid rapeseed oil fatty acids that have been hydrogenated to an Iodine Value of about 8 or less.

The solid saturated polyol polyester generally by itself crystallizes into well defined spherulitic particles from a molten composition at or below the onset crystallization temperature of the solid saturated polyol polyester. The onset crystallization temperature is that temperature at which a solid polyol fatty acid polyester can first begin to crystallize in the liquid polyol fatty acid polyester. That is, when dissolved in a molten composition comprising the solid saturated polyol polyester in a liquid polyol fatty acid polyester, the solid saturated polyol polyester will tend to form well defined, highly ordered, substantially sphere-shaped crystals, called spherulites, when permitted to cool and crystallize at a first crystallization temperature. In the absence of other solid nondigestible oil components, such as a solid diversely esterified polyol polyester or a polyol polyester polymer, the solid saturated polyol polyester would normally crystallize into spherical-shaped particles called spherulites having a diameter (or maximum particle dimension) of about 3 microns or larger, usually about 3–32 microns, the size being a function of the initial concentration of the solid saturated polyol polyester in the liquid polyol fatty acid polyester and the rate of shearing applied during the crystallization. As will be understood from the processing description herein after, if rapidly cooled and crystallized under shear, a solid saturated polyol polyester will tend to crystallize as discrete non-spherulite particles, typically of less than about 30 microns, preferably less than about 10 microns (although portion of the crystals can form as very small spherulites may also form), as opposed to the above mentioned larger spherulites which readily form at slower rates of cooling (crystallizing) and slower rates of shear.

When co-crystallized with other solid polyol fatty acid polyester components, such as the solid diversely esterified polyol polyesters or polyol polyester polymers, the solid saturated polyol polyester will tend not to form the highly ordered spherulite particles.

ii) Solid Diversely Esterified Polyol Polyesters

The solid diversely esterified polyol polyester of the present invention comprises polyol polyesters which have their ester group-forming fatty acid radicals selected so that the polyol backbone does not contain all of a single type of ester group. Generally, these polyol polyesters contain two basic types of ester groups. These are (a) ester groups formed from long chain saturated fatty acid radicals, as herein above described, and (b) dissimilar ester groups formed from acid radicals which are "dissimilar" to the long chain saturated fatty acid radicals. When these "dissimilar" fatty acid and/or other organic acid radicals are esterified onto a polyol that contains or will contain long chain saturated fatty acid radicals, they will introduce diverse esterification into the resulting polyol polyester molecule, thereby altering the crystal structure as these molecules pack together during crystallization. This diverse esterification can be due to differences in length of the ester forming acid radicals (e.g., short chain versus long chain), or other steric factors, e.g. branched chain versus straight chain, unsaturated chain versus saturated chain, aromatic chain versus aliphatic chain, etc. Polyol polyesters containing these "long chain" and "dissimilar" ester groups are therefore herein called "solid diversely esterified polyol polyesters".

The solid diversely esterified polyol polyesters tend to have "asymmetrical" or irregular molecular structures. It is believed that the asymmetrical structure of these molecules interfere with the normal packing tendency of the symmetrical solid saturated polyol polyester molecules during co-crystallization in the liquid polyol polyester. This interference blocks the usual unrestrained three dimensional growth of the solid saturated polyol polyester molecules and thus induces restrained three dimensional growth or otherwise induces growth in at most two dimensions, e.g., the formation of relatively thin platelet-like particles.

The dissimilar ester groups are formed from acid radicals selected from long chain unsaturated fatty acid radical, short chain saturated fatty acid radical, and other dissimilar fatty acid radicals, and mixtures thereof. The preferred dissimilar acid radical is a long chain unsaturated fatty acid radical.

The long chain unsaturated fatty acid radicals are typically straight chain (i.e., normal) mono- and di-unsaturates, and contain at least about 12, preferably about 12 to about 26, more preferably about 18 to 22, and most preferably 18 carbon atoms. Examples of suitable long chain unsaturated fatty acid radicals for the solid polyol polyesters herein are lauroleate, myristoleate, palmitoleate, oleate, elaidate, erucate, linoleate, linolenate, arachidonate, eicosapentaenoate, and docosahexaenoate. For oxidative stability, the mono and/or diunsaturated fatty acid radicals are preferred.

The short chain saturated fatty acid radicals are typically normal and contain 2 to 12, preferably 6 to 12 and most preferably 8 to 12, carbon atoms. Examples of suitable short chain saturated fatty acid radicals are acetate, butyrate, hexanoate (caproate), octanoate (caprylate), decanoate (caprate), and dodecanoate (laurate).

Other dissimilar ester-forming radicals can include fatty-fatty acid radicals having at least one hydroxyl group that is esterified with another fatty or other organic acid. Nonlimiting examples of suitable fatty-fatty acid radicals include 12-hydroxy-9-octadecenoic acid (ricinoleic acid), 12-hydroxy-octadecanoic acid, 9-hydroxy-octadecanoic acid, 9-hydroxy-10, 12-octadecadienoic acid, 9-hydroxy-octadecanoic, 9, 10-dihydroxyoctadecanoic acid, 12, 12-dihydroxyeicosanoic acid, and 18-hydroxy-9, 11, 13-octadecatrienoic acid (kamolenic acid). Ricinoleic acid is a preferred hydroxy-fatty acid. Castor oil is a convenient source of ricinoleic acid. Other sources of hydroxy-fatty acids include hydrogenated castor oil, strophanthus seed oils, calendula officinalis seed oils, hydrogenated strophanthus seed oils and hydrogenated calendula officinalis seed oils, cardamine impatiens seed oils, kamala oils, mallotus discolor oils, and mallotus claoxyloides oils.

Specific, non-limiting examples of solid polyol fatty acid polyesters of the present invention are sorbitol hexaester in which the acid ester radicals are palmitoleate and arachidate in a 1:2 molar ratio; the octaester of raffinose in which the acid ester radicals are linoleate and behenate in a 1:3 molar ratio; the heptaester of maltose wherein the esterifying acid radicals are sunflower seed oil fatty acids and lignocerate in a 3:4 molar ratio; the octaester of sucrose wherein the esterifying acid radicals are oleate and behenate in a 2:6 molar ratio; and the octaester of sucrose wherein the esterifying acid radicals are laurate, linoleate and behenate in a 1:3:4 molar ratio. A preferred material is sucrose polyester in which the degree of esterification is 7–8, and in which the fatty acid radicals are $C_{18}$ mono- and di- unsaturated and behenic, in a molar ratio of about 2:6 to about 1.5:6.5.

iii) Solid Polyol Polyester Polymers

Polyol polyester polymers are those formed by polymerizing a polyol polyester monomer to provide a molecule having at least two separate esterified polyol moieties linked by covalent bonds between ester groups of these different polyol moieties. For example, two sucrose octabehenate monomers could be cross-linked between fatty acids to form a polymer. Repeating units of such polyol polyester polymers can be the same or different such that the generic term "polymer" in this context includes the specific term "copolymer". The number of repeating monomer (or co-monomer) units which make up such polyol polyester polymers can range from about 2 to 20, preferably from about 2 to 12. Depending on the method of preparing them, the polyol polyester polymers are frequently oligimers containing from 2 to 4 monomeric units, i.e., are dimers, trimers, or tetramers. The most typical type of polyol polyester polymer for use herein is dimer.

Figure 1A:
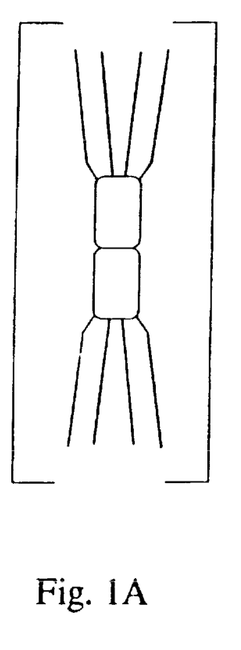
FIGS. 1a through 1c depict sucrose octaester monomer, dimer and trimer, respectively.
Figure 1B:
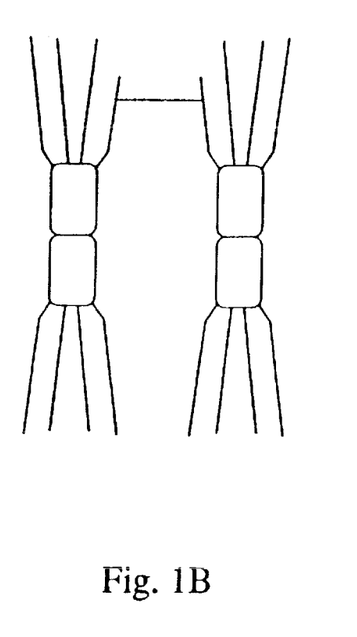
Figure 1C:
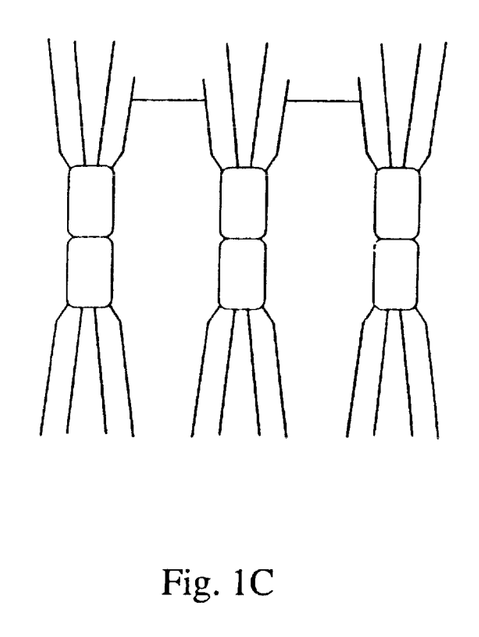

When sucrose is used as the polyol of the polyester polymer, it is preferably completely esterified with fatty acid or other ester group-forming acid radicals. Using sucrose as the polyol, completely esterified sucrose polyester monomer, dimer, and trimer are shown schematically in FIGS. 1a, 1b, and 1c, respectively. At least about 15%, preferably at least about 45%, more preferably at least about 75%, and most preferably at least about 90% of the hydroxyl groups of the polyol polyester polymer material should be esterified with long chain ($C_{20}$ and higher) saturated fatty acid radicals. The sucrose polyester polymers used herein can advantageously have a number, average molecular weight of from about 4000 to about 60,000, preferably from about 4000 to about 36,000, more preferably from about 5000 to about 12,000.

Suitable long chain saturated fatty acid radicals for use in preparing the polyol polyester polymers (and its monomers) include those herein before described for preparing the solid diversely esterified polyol polyesters. As in the case of the solid diversely esterified polyol polyesters, mixed fatty acid radicals from source oils which contain substantial amounts of the desired long chain saturated fatty acids (i.e, at least about 30%, preferably at least about 50%, more preferably at least about 80%) can be used as sources of acid radicals in preparing these polyol polyester polymers.

Suitable polyol polyester material which forms the solid nondigestible particles used in the fat compositions herein will generally comprise from about 0% to 99% of the polyol polyester polymer component and from 1% to about 100% of the unpolymerized polyol polyester monomer component, preferably from about 0% to about 90% of the polyol polyester polymer component and from about 10% to about 100% of the monomer component, more preferably from about 0% to 70% of the polymer component and from 30% to about 100% of the monomer component, and most preferably from about 0% to 50% of the polymer component and from 50% to about 100% of the monomer component.

2. Processes for Making Solid Polyol Fatty Acid Polyesters

The solid polyol fatty acid polyesters, including the solid saturated polyol polyester and the solid diversely esterified polyol polyester, the solid polyol polyester polymer and the solid polyol polyester polymer, used in the present invention can be made according to prior known methods for preparing polyesters of polyols. Since the sucrose polyesters are the preferred solid polyol polyesters herein, the invention will be exemplified primarily by these materials.

One such method of preparation is by reacting the acid chlorides of the fatty acids with sucrose. In this method a mixture of the acid chloride or acid anhydrides of the fatty acids can be reacted in one step with sucrose, or the acid chlorides can be reacted sequentially with sucrose. Another preparation method is by the process of reacting methyl esters of the fatty acids with sucrose in the presence of a fatty acid soap and a basic catalyst such as potassium carbonate. See, for example, U.S. Pat. Nos. 3,963,699, Rizzi et al., issued Jun. 15, 1976; U.S. Pat. No. 4,518,772, Volpenhein, issued May 21, 1985; and U.S. Pat. No. 4,517,360, Volpenhein, issued May 14, 1985, and U.S. Ser. No. 417,990, Letton, filed Oct. 6, 1989, all incorporated herein by reference. Methods for preparing polyol polyester polymers are described in U.S. Pat. No. 5,451,416, issued Sep. 19, 1995 (Johnston et. al.) the disclosure of which is incorporated herein by reference.

When using the methyl ester route for preparing the solid polyol polyesters herein, the fatty acid methyl esters are blended in the desired ratio and reacted with sucrose by transesterification to obtain the sucrose esters of mixed unsaturated/saturated or saturated fatty acids. In a preferred way of practicing the methyl ester process, five moles of the blended saturated/unsaturated or saturated methyl esters are reacted with sucrose in a first stage at 135° C. to obtain partial esters of sucrose. An additional nine moles of the blended esters are then added and the reaction continued at 135° C. under reduced pressure until the desired degree of esterification has been attained.

When two or more of the solid saturated polyol polyester, solid diversely esterified polyol polyester and solid polyol polyester polymer are used as the solid polyol polyester, then can be made and incorporated separately into the nondigestible oil composition, or alternatively, they can be made and mixed together and incorporated into the nondigestible oil composition. In a preferred process where the solid polyol fatty acid polyester comprises the solid saturated polyol polyester and the solid diversely esterified polyol polyester, the two solid polyesters are made simultaneously in the same polyol esterification preparation. The preferred method of making the solid polyol fatty acid polyester is to esterify the polyol with a mixture of long chain saturated fatty acid lower alkyl (preferably methyl) esters, and dissimilar fatty acid alkyl (preferably methyl) esters selected from short chain saturated fatty acid alkyl esters, long chain unsaturated fatty acid alkyl esters, dissimilar acid alkyl esters, and mixtures thereof. When prepared in the same preparation, the esterification of the polyol hydroxy sites by the mixture of long chain saturated fatty acid radicals and dissimilar fatty acid radicals will occur substantially randomly. In order to ensure that a portion of the solid polyol polyesters are esterified only with long chain saturated fatty acid radicals, it is generally required to include proportionally more of the long chain saturated fatty acid radicals as compared to the dissimilar fatty acid radicals. For example, sucrose has 8 hydroxy sites which are capable of being esterified. Depending upon the chain lengths of the esters and other processing conditions, in order to obtain a significant (10% or greater) amount of sucrose octasaturate and sucrose heptasaturate polyester from the reaction of sucrose with a mixture of long chain saturated fatty acid methyl esters and long chain unsaturated fatty acid methyl esters, a molar ratio of long chain saturated esters to long chain unsaturated esters of about 6:2 or more will be needed. As an example of a particularly preferred solid polyol polyester, a molar ratio of 6.5:1.5 of C22 saturated fatty acid ester to cottonseed oil (about 73% unsaturated) ester is used, resulting in about 20% on a molar basis of sucrose octasaturate and sucrose heptasaturate polyester (as the solid saturated polyol polyester), with the remaining polyesters (about 80% on a molar basis) being substantially octa- and hepta-substituted and having a mixture of long chain saturated fatty acid radicals and long chain unsaturated fatty acid radicals (as the diversely esterified polyol polyester). Increasing the ratio of long chain saturated radicals to long chain unsaturated radicals will result in a higher proportion of the solid polyesters being converted to solid saturated polyol polyesters; conversely decreasing the ratio of long chain saturated fatty acid radicals to long chain unsaturated fatty acid radicals will tend to result in a lower proportion of the solid polyesters being converted to the solid saturated polyol polyesters.

Mixed fatty acid radicals from source oils which contain substantial amount of the desired unsaturated or saturated acids can be used as the fatty acid radicals to prepare compounds of the invention. The mixed fatty acid radicals from the oils should contain at least about 30% (preferably at least about 50%, most preferably at least about 80%) of the desired unsaturated or saturated acids. For example, rapeseed oil fatty acid radicals or soybean oil fatty acid radicals can be used instead of pure $C_{12}$–$C_{26}$ unsaturated fatty acids. Hardened (i.e., hydrogenated) high erucic rapeseed oil fatty acids can be used instead of pure $C_{20}$–$C_{26}$ saturated fatty acids. Preferably the $C_{20}$ and higher acids (or their derivatives—e.g., methyl esters) are concentrated, for example by distillation. The fatty acids from palm kernel oil or coconut oil can be used as a source of $C_8$ to $C_{12}$ acids. An example of the use of source oils to make solid polyol polyesters of the invention is the preparation of solid sucrose polyester, employing the fatty acids of high oleic sunflower oil and substantially completely hydrogenated high erucic rapeseed oil. When sucrose is substantially completely esterified with a 1:3 by weight blend of the methyl esters of the fatty acids of these two oils, the resulting sucrose polyester will have a molar ratio of unsaturated $C_{18}$ acid radicals to $C_{20}$ and higher saturated acid radicals of about 1:1 and 28.6 weight percent of the total fatty acids in the polyester will be $C_{20}$ and $C_{22}$ fatty acids. The higher the proportions of the desired unsaturated and saturated acids in the fatty acid stocks used in making the solid polyol polyester, the more efficient the ester will be in its ability to bind liquid oils.

One way to prepare this material is by synthesizing monomeric polyol polyester according to known polyol esterification, transesterification and/or interesterification methods and by then polyrmerizing these monomers. The polymerization step can be initiated and promoted by any of a number of well known methods, including, but not limited to, photochemical reactions and reactions with transition metal ions, heat or free radical initiators such as di-tert-butyl peroxide.

Alternatively, polyol polyester polymers can be prepared directly by esterifying and/or interesterifying the polyol material with polybasic polymerized fatty acids or their derivatives. For example, the polyol polyester polymers could be prepared by reacting the acid chlorides or acid anhydrides of the desired esterifying polymer acids with sucrose, preferably using a sequential esterification process in the manner described herein before for the preparation of diversely esterified polyol polyesters. The polyol polyester polymers could also be prepared by reacting the methyl esters of the desired polymer acids with sucrose in the presence of a fatty acid soap and a basic catalyst, such as potassium carbonate in the manner described herein before for the preparation of diversely esterified polyol polyesters.

When using the foregoing methods for preparing sucrose polyester material containing both unpolymerized and polymerized fatty acid groups, the molar ratio of unpolymerized to polymerized fatty acids in the resulting sucrose material can range from about 2:6 to about 4:4.

When using the acid chloride or methyl ester procedures herein before described to esterify the polyol with already polymerized fatty acids, a wide variety of pre-polymerized fatty acid materials can be used. One such class of suitable polymerized fatty acids comprises long-chain, aliphatic, dibasic acids having from about 28 to about 44 carbon atoms in their molecules. They are generally formed from unsaturated fatty acids having from about 14 to about 22 carbon atoms which can be polymerized. For example linoleic acid can be polymerized by heating to form linoleic acid dimer as follows:

Common examples of polymerizable acids of this type are those containing two or more double bonds (polyunsaturated acids) such as the octadecadienoic acids containing two double bonds, for example, the above-mentioned linoleic acid, and the octadecatrienoic acids containing 3 double bonds, for example, linolenic and eleostearic acids. Other common polymerizable polyunsaturated acids having from about 14 to about 22 carbon which can be used to esterify polyols and thereby form the polyol polyester polymers herein are octadecatrienoic acid (e.g., licanic acid), actadectetraenoic acid (e.g., parinaric acid), eicosadienoic acid, eicostetraenoic acid (e.g., arachidonic acid), 5,13-docosadienoic acid and clupanodonic acid. Monounsaturated fatty acids, such as oleic, elaidic and erucic acids, can also be used in preparing suitable long chain fatty acid dimers which in turn can then be used to form the solid polyol polyester polymer particles used in the present invention.

Mixed fatty acid radicals from source oils which contain substantial amounts of the desired polymerizable polyunsaturated or monounsaturated fatty acids can be used as sources of acid radicals in preparing the polyol polyester polymer materials used to form the solid particles used in the present invention. The mixed fatty acids from such source oils should preferably contain at least about 30% (more preferably at least about 50%, most preferably at least about 80%) of the desired polymerizable polyunsaturated or monounsaturated fatty acids.

Illustrative of natural sources which are rich in linoleic acid are soybean oil, cottonseed oil, peanut oil, corn oil, sesame seed oil, sunflower seed oil, safflower oil, linseed oil and perrilla oil. Oiticica oil is a particularly good source of licanic acid and tung oil contains a high concentration of eleostearic acid. Fish oils, such as herring, menhaden, pilchard, salmon and sardine oil are also suitable sources of polymerizable acids, particularly the higher fatty acids such as arachidonic and clupanodonic acids. Other oils such as tall oil, dehydrated castor oil, olive oil and rapeseed oil also contain significant proportions of suitable unsaturated acids. For example, olive oil is rich in oleic acid and rapeseed oil is rich in erucic acid.

Preferred polybasic polymerized fatty acids and fatty acid derivatives for use in preparing polymer-containing polyol polyesters include dibasic acids produced by dimerization of the fatty acids or fatty acid lower esters derived from polyunsaturated vegetable oils such as soybean oil or cottonseed oil or from animal fats such as tallow.

All of the foregoing types of polybasic polymerized fatty acids may themselves be made by a variety of methods known to those skilled in the art. (See Lutton; U.S. Pat. No.

3,353,967; Issued Nov. 21, 1967, Goebel; U.S. Pat. No. 2,1482,761; Issued Sep. 27, 1949, Harrison et al; U.S. Pat. No. 2,731,481; Issued Jan. 17, 1956 and Barrett et al; U.S. Pat. No. 2,793,219; Issued May 21, 1957, all of which are incorporated herein by reference.)

As noted, a mixture of both polymerized and unpolymerized polyol polyester material can be prepared by reacting the polyol with both polymerized and unpolymerized esterifying fatty acids or fatty acid derivatives. In a preferred method for preparing particularly desirable solid sucrose polyester material comprising sucrose polyester polymers, fractionated or unfractionated high erucic acid rapeseed (HEAR) methyl esters are partially polymerized, hardened and then reacted with sucrose. Another method of making these especially desirable solid sucrose polyesters is to make liquid sucrose polyester material esterified with fatty acid groups of high erucic acid rapeseed oil by a conventional process, to then partially polymerize the resulting liquid sucrose polyester material, and to then harden the resulting polymerized material.

3. Liquid Polyol Fatty Acid Polyester

A key component of the nondigestible oil composition herein is a liquid polyol fatty acid polyester having a complete melting point below about 37° C. Suitable liquid nondigestible edible oils for use herein include liquid polyol polyesters (see Jandacek; U.S. Pat. No. 4,005,195; issued Jan. 25, 1977); liquid esters of tricarballylic acids (see Hamm; U.S. Pat. No. 4,508,746; issued Apr. 2, 1985); liquid diesters of dicarboxylic acids such as derivatives of malonic and succinic acid (see Fulcher, U.S. Pat. No. 4,582,927; issued Apr. 15, 1986); liquid triglycerides of alpha-branched chain carboxylic acids (see Whyte; U.S. Pat. No. 3,579,548; issued May 18, 1971); liquid ethers and ether esters containing the neopentyl moiety (see Minich; U.S. Pat. No. 2,962,419; issued Nov. 9, 1960); liquid fatty polyethers of polyglycerol (See Hunter et al; U.S. Pat. No. 3,932,532; issued Jan. 13, 1976); liquid alkyl glycoside fatty acid polyesters (see Meyer et al; U.S. Pat. No. 4,840,815; issued Jun. 20, 1989); liquid polyesters of two ether linked hydroxypolycarboxylic acids (e.g., citric or isocitric acid) (see Huhn et al; U.S. Pat. No. 4,888,195; issued Dec. 19, 1988); and liquid esters of epoxide-extended polyols (see White et al; U.S. Pat. No. 4,861,613; issued Aug. 29. 1989); as well as liquid polydimethyl siloxanes (e.g. Fluid Silicones available from Dow Corning). All of the foregoing patents relating to the liquid nondigestible oil component are incorporated herein by reference.

Preferred liquid nondigestible oils are the liquid polyol polyesters that comprise liquid sugar polyesters, liquid sugar alcohol polyesters, and mixtures thereof. The preferred sugars and sugar alcohols for preparing these liquid polyol polyesters include erythritol, xylitol, sorbitol, and glucose, with sucrose being especially preferred. The sugar or sugar alcohol starting materials for these liquid polyol polyesters are preferably esterified with fatty acids containing from 8 to 22 carbon atoms, and most preferably from 8 to 18 carbon atoms. Suitable naturally occurring sources of such fatty acids include corn oil fatty acids, cottonseed oil fatty acids, peanut oil fatty acids, soybean oil fatty acids, canola oil fatty acids (i.e. fatty acids derived from low erucic acid rapeseed oil), sunflower seed oil fatty acids, sesame seed oil fatty acids, safflower oil fatty acids, fractionated palm oil fatty acids, palm kernel oil fatty acids, coconut oil fatty acids, tallow fatty acids and lard fatty acids.

The nondigestible polyol polyesters that are liquid are those which have minimal or no solids at body temperatures (i.e., 98.6° F., 37° C.). These liquid polyol polyesters typically contain ester groups having a high proportion of $C_{12}$ or lower fatty acid radicals or else a high proportion of $C_{18}$ or higher unsaturated fatty acid radicals. In the case of those liquid polyol polyesters having high proportions of unsaturated $C_{18}$ or higher fatty acid radicals, at least about half of the fatty acids incorporated into the polyester molecule are typically unsaturated. Preferred unsaturated fatty acids in such liquid polyol polyesters are oleic acid, linoleic acid, and mixtures thereof.

The following are nonlimiting examples of specific liquid polyol polyesters suitable for use in the present invention: sucrose tetraoleate, sucrose pentaoleate, sucrose hexaoleate, sucrose heptaoleate, sucrose octaoleate, sucrose hepta- and octaesters of unsaturated soybean oil fatty acids, canola oil fatty acids, cottonseed oil fatty acids, corn oil fatty acids, peanut oil fatty acids, palm kernel oil fatty acids, or coconut oil fatty acids, glucose tetraoleate, the glucose tetraesters of coconut oil or unsaturated soybean oil fatty acids, the mannose tetraesters of mixed soybean oil fatty acids, the galactose tetraesters of oleic acid, the arabinose tetraesters of linoleic acid, xylose tetralinoleate, galactose pentaoleate, sorbitol tetraoleate, the sorbitol hexaesters of unsaturated soybean oil fatty acids, xylitol pentaoleate, and mixtures thereof.

The liquid polyol polyesters suitable for use in the compositions herein can be prepared by a variety of methods known to those skilled in the art. These methods include: transesterification of the polyol (i.e. sugar or sugar alcohol) with methyl, ethyl or glycerol esters containing the desired acid radicals using a variety of catalysts; acylation of the polyol with an acid chloride; acylation of the polyol with an acid anhydride; and acylation of the polyol with the desired acid, per se. (See, for example, U.S. Pat. Nos. 2,831,854, 3,600,186, 3,963,699, 4,517,360 and 4,518,772, all of which are incorporated by reference. These patents all disclose suitable methods for preparing polyol polyesters.)

4. Other Shortening Ingredients

So long as they do not interfere with the formation of the flowable nondigestible oil, the flowable nondigestible oil compositions may also comprise other shortening ingredients. Various additives can be used herein provided they are edible and aesthetically desirable and do not have any detrimental effects on the shortenings. These additives include edible, digestible oils and hardstock, fat-soluble vitamins, flavorings and seasonings, emulsifiers, anti-spattering agents, chelating agents, anti-sticking agents, antioxidants, anti-foaming agents (for frying applications) or the like.

5. Formation of Stiffened Nondigestible Oil

Ordinarily, and when not practicing the process of the present invention, the nondigestible oil composition described herein is capable of crystallizing from a molten liquid form to a stiffened nonflowable oil form when the nondigestible oil composition is rapidly cooled from the molten temperature to the crystallization temperature of the solid polyol polyester, or less (for example, to body temperature, about 37° C.) under substantially quiescent conditions. This stiffened nonflowable nondigestible oil comprises the liquid nondigestible oil portion retained substantially completely within the crystalline matrix of crystallized solid polyol fatty acid polyester, thereby providing the desired passive oil loss control of the nondigestible oil. The composition and method of making of the food composition should be selected to provide the sufficiently rapid cooling of the nondigestible oil from a molten temperature to a lower temperature substantially in the absence of shearing of the food composition, such that the solid polyol fatty acid polyester has crystallized into the desired crystalline form which provides the desired passive oil loss control. Generally, this cooling rate from the onset crystallization temperature of the highest melting solid polyol fatty acid polyester to the crystallization temperature (of the lowest melting solid polyol fatty acid polyester component) is greater than about 0.5° C./min, more preferably greater than about 2.5° C./min, and most preferably greater than 25° C./min. In the case of a polyol polyester polymer, which can form the desired crystal structure for passive oil loss control at much slower cooling rates, a cooling rate of greater than about 0.03° C./min. under the quiescent conditions is generally sufficient to form the desired crystal structure.

When a nondigestible oil composition comprising a solid polyol fatty acid polyester containing any one or a combination of a solid saturated polyol polyester, a solid diversely esterified polyol polyester, and a polyol polyester polymer, begin to crystallize (or co-crystallize) in the liquid polyol polyester, the crystals (or co-crystals) initially appear as discrete, unaggregated entities, suspended in the liquid polyol fatty acid polyester. Under quiescent cooling conditions, such as when the molten nondigestible oil has been processed into food products via baking or frying, these discrete unaggregated entities can grow as crystallization continues, and begin to cluster together to form small aggregates of at least 3 microns, dispersed in the liquid nondigestible oil. These small aggregate clusters of particles can develop in a variety of forms and shapes, including spherical, platelet-like, filament-like or rod-like, or combinations of these various shapes, but are typically spherical or platelet-like. Thinner aggregate particles, referred to as platelets, are preferred from the standpoint of providing more efficient passive oil loss control of the liquid polyol polyester component of the nondigestible oil compositions herein. These platelet particles preferably have a thickness of about 0.1 micron or less, more preferably about 0.05 micron or less. As the crystallization continues, the platelets continue to grow and to cluster together to form a larger aggregate particle that is porous in character and thus capable of entrapping significant amounts of the liquid polyol polyester. It is believed that this porous structure and its concomitant ability to entrap large amounts of liquid polyol polyester is why these larger aggregated, platelet-like particles can provide very effective and efficient passive oil loss control, and results in a stiffened, nonflowable nondigestible oil.

B. Process for Making a Flowable Nondigestible Oil Composition

The present invention also provides a process for making a flowable nondigestible oil, wherein the nondigestible oil comprises a) a liquid polyol fatty acid polyester having a complete melt point less than 37° C., and b) a solid polyol fatty acid polyester having a complete melt point of at least about 37° C. The process comprises the steps of melting completely the nondigestible oil composition containing the solid polyol fatty acid polyester, rapidly cooling the melted nondigestible oil to a crystallization temperature, thereby rapidly crystallizing at least a substantial portion of the solid polyol fatty acid polyester, and shearing the nondigestible oil composition during the step of crystallizing to form the flowable nondigestible oil composition. Optionally, following the crystallizing and shearing steps, the process can include the step of tempering the crystallized nondigestible oil composition for a time sufficient to substantially completely crystallize all of the solid polyol fatty acid polyester, the step of adding a stabilizing amount of a diluent liquid, typically a liquid polyol fatty acid polyester, to the crystallized nondigestible oil composition, or both steps.

The process of the present invention for making a flowable nondigestible oil typically requires at least about 5 minutes and generally no more than about 3 hours, preferably at least about 5 minutes and generally no more than about 2 hours, more preferably at least about 10 minutes and no more than about 1 hour, and most preferably at least about 15 minutes and no more than about 30 minutes.

Without the invention being bound by any theory of crystallization described herein, it is understood that crystallization of the solid polyol fatty acid polyester occurs kinetically. As with any kinetic reaction, a dynamic equilibrium can be achieved wherein the reaction may appear to have halted. Then, by changing the conditions, the reaction can be made to proceed forward, or even to reverse. In the same way, the solid polyol fatty acid polyester can crystallize under a condition until a dynamic equilibrium is achieved. The dynamic equilibrium can exist wherein a portion of a solid polyol fatty acid polyester is still dissolved in the liquid polyol polyester while the preponderance has been crystallized. The rate at which a solid polyol fatty acid polyester will crystallize depends upon several factors, such as, the molecular composition of the solid polyol fatty acid polyester, the concentration of the solid polyol fatty acid polyester, the proportion of solid polyol fatty acid polyester already crystallized to that remaining dissolved in the liquid polyol fatty acid polyester, and the temperature differential between the onset crystallization temperature of the solid polyol fatty acid polyester and the temperature of crystallization. At the onset of crystallization, the solid polyol fatty acid polyester will initially crystallize at a high crystallization rate. This crystallization rate slows with time, eventually (ideally) to a rate of zero. Then, when the solution is further cooled to a lower temperature the equilibrium is shifted such that additional solid polyol fatty acid polyester can crystallize from the liquid polyol polyester. While the proportion of solid polyol fatty acid polyester which will crystallize with an incremental reduction in temperature is generally low, it is believed that additional crystallizing solid polyol fatty acid polyester will, in the absence of shearing, tend to crystallize as discrete, unaggregated entities suspended in the liquid polyol fatty acid polyester or onto other aggregate particles. The discrete unaggregated entities may begin to cluster together to form small aggregates, typically up to several microns in size. However, in the presence of applied shear, these unaggregated entities generally do not form into aggregate particles, and any aggregate particles that might form do not generally continue to cluster into a large matrix of crystal aggregate, thereby promoting the flowability of the nondigestible oil.

The flowable nondigestible oil composition of the present invention can be processed using crystallization and mixing equipment that is commonly employed to crystallize fats. Both batch and continuous processing systems and equipment can be used, though a continuous system is generally preferred. The general requirement of the system is to be capable of rapidly cooling the molten polyol polyester component to the crystallization temperature range, and crystallizing at least a substantial portion of the solid polyol fatty acid polyester, most preferably while simultaneously shearing the composition sufficiently to form the flowable nondigestible oil composition.

1. Melting of the Nondigestible Oil Composition

The first step of the process of the present invention comprises melting the solid polyol fatty acid polyesters in the liquid polyol polyester at a temperature above the temperature where the last amount of solid material of the solid polyol fatty acid polyester is melted into the liquid. Preferably, the composition is raised to a temperature at least 10° C. above the complete melt temperature of the solid polyol fatty acid polyester.

In the molten state, the nondigestible oil compositions are generally transparent and clear. It will be observed that as solid polyol fatty acid polyester begins to crystallize (at and below the onset crystallization temperature of the solid polyol fatty acid polyester), the liquid polyol polyester begins to become turbid and clouded. The "onset crystallization temperature" for a solid polyol fatty acid polyester can be determined by the method described below in the Analytical section.

2. Crystallization of the Solid Polyol Fatty Acid Polyester

The next step of the process comprises rapidly crystallizing at least a substantial portion of the solid polyol fatty acid polyester, defined as at least more than 50% by weight, and preferably more than 80%, more preferably more than 95%, and most preferably more than 99%. This step can comprise the steps of reducing the temperature of the molten polyol polyester composition to a crystallization temperature of the solid polyol fatty acid polyester, and holding the polyol polyester composition at the crystallization temperature for a time sufficient to crystallize the substantial portion of the solid polyol fatty acid polyester. The crystallization temperature is preferably within a crystallization temperature range of from about the onset crystallization temperature of the solid polyol fatty acid polyester, down to about 25° C., preferably down to about 10° C. Where the solid polyol fatty acid polyester contains two or more distinct solid polyol fatty acid polyester materials having different onset melting temperatures, preferably the crystallization temperature is below the lowest onset temperature thereof, and preferably at least about 5° C., more preferably at least about 10° C., below the lowest onset crystallization temperature. Most preferably, the crystallization temperature of the solid polyol fatty acid polyester is within the temperature range of the storage conditions for the flowable nondigestible oil, typically about 15° C. to about 40° C. though more preferably about 25° C. to about 30° C. It should be understood that the rate of crystallization of the solid polyol fatty acid polyester will be higher as the crystallization temperature is reduced lower below the onset crystallization temperature of the solid polyol polyester.

The step of rapidly crystallizing the substantial portion of the solid polyol fatty acid polyester typically is completed in less than about 30 minutes, preferably in less than about 5 minutes, and more preferably in less than about 30 seconds, and most preferably in less than about 15 seconds. Generally about 5 seconds to about 30 seconds are needed depending upon the type of equipment used. While the step can be completed within a period of time of more than 30 minutes, such additional time is understood to provide no particular additional benefits.

The process also comprises the step of shearing during the step of crystallizing the solid polyol fatty acid polyester at the crystallization temperature. By applying shear to the composition during the crystallization, the solid polyol fatty acid polyester is encouraged to crystallize into discrete crystals and unaggregated crystal platelets. By shearing while the crystallization is occurring, the resulting discrete and unaggregated crystals can be inhibited from growing to a size that might be large enough to separate from the liquid phase. It is also believed that the small crystal platelets may aggregate, into small aggregate particles, but that the shearing inhibits the small aggregate particles from further clustering into larger aggregate particles which can begin to stiffen the composition. During the crystallizing step, shear is imparted to the polyol polyester composition at from about 400 sec$^{-1}$ to about 8000 sec$^{-1}$, more preferably at from about 500 sec$^{-1}$ to about 6000 sec$^{-1}$.

The crystallizing step can be conducted in such equipment as a swept-wall, scraped-wall, or screw-type heat exchanger or equivalent, scraped wall agitated reactors, plate and frame heat exchangers, and tube and shell heat exchangers. Such equipment in general cools the composition at a rate of from about 0.4° C./min. to 300° C./min., more preferably from about 0.8° C./min. to about 150° C./min. Examples of such heat exchangers include Cherry Burrell Votator, Girdler "A" units, a Sollich Turbo Temperer, and a Groen Model #DR(C) used for margarine and shortening manufacture, and Aasted chocolate tempering units. A preferred unit is the Votator unit which consists of a steel shaft rotating in a tube which is cooled externally by a coolant. The rotating shaft is fitted with scraper blades which press against the cool inner surface at high rotation speeds, continuously scraping the crystallizing composition from the inner surface of the tube. References to these conventional units include: Greenwell, B. A., J. Amer. Oil Chem. Soc., March 1981, pp. 206–7; Haighton, A. J., J. Amer. Oil Chem. Soc., 1976, Vol. 53, pp. 397–9; Wiedermann, L. H. J. Amer. Oil Chem. Soc., Vol. 55, pp. 826–7; Beckett, S. T., editor, Industrial Chocolate Manufacture and Use, Van Nostrand Reinhold, New York, 1988, pp. 185–9. All of these publications are incorporated herein by reference.

A scraped wall heat exchanger is a preferred apparatus for rapidly reducing the temperature and crystallizing the composition under high shear, typically at temperature reduction rates of about 8–300° C./min., and preferably about 100–300° C./min. The temperature of the coolant used for this crystallizing step in this equipment is sufficiently low to quickly cool the polyol polyester composition, but not so low so as to cause a significant amount of plating out of the polyol polyester onto the chilled surfaces of the apparatus. Typically the coolant temperature is in the range of from about −23° C. to about 20° C., more preferably in the range of from about −6.7° C. to about 7° C. Typical coolants include liquid ammonia, brine, and other refrigerants.

The melted oil can also be pre-cooled before entering the scraped wall heat exchanger, to a temperature not far above the onset crystallization temperature of the solid polyol fatty acid polyester, using a separate heat exchanger.

In general, the rate of shearing to be applied of the composition during the crystallization step should be commensurate with the rate of crystallization of the solid polyol polyester. That is, for example, when the crystallization temperature is set well below the onset crystallization temperature such that the rate of crystallization is very high; then higher rates of shearing are needed to form the desired crystal platelet particles. Of course, if the crystallization rate greatly exceeds the shearing rate, such that large aggregate particles are formed in the composition, the shearing can be continued after crystallization has slowed or stopped to effect a reduction in the large aggregate particles and a resulting more flowable composition, by the breaking and tearing of the large aggregate particles by the force of shear.

Following the step of rapidly crystallizing and shearing the polyol polyester composition to form the discrete and unaggregated crystal particles, it is preferred to continue shearing the crystallized composition at the crystallization temperature for a time sufficient for crystallization of the solid polyol fatty acid polyester to come substantially to completion, and to allow the solid polyol fatty acid polyester to complete crystallization to the discrete and unaggregated crystal particles. The continued shearing step serves to disrupt the formation of larger aggregate particles and any three-dimensional crystalline matrix that otherwise can form from the larger aggregate particles in the absence of the shearing. Such continued shearing preferably avoids creating any dead zones in the mixing vessel which might resulting in a localized stiffened composition. Typically the continued shearing is done for at least about 2 seconds, preferably for about 5 minutes, and more preferably for at least about 10 minutes. Generally no more than about 2 hours, preferably about no more than 1 hour, more preferably no more than about 30 minutes, is required for the continued shearing step.

In the continued shearing step, generally less shear is needed in comparison with that used during the crystallization step. Generally during the continued shearing step, shear rates range from about 10 $sec^{-1}$ to about 8000 $sec^{-1}$. Preferred types of apparatus for carrying out the continued shearing step include any agitated, jacketed vessel capable of being operated such that preferably air can be excluded from incorporation into the polyol polyester composition, and the temperature of the composition can be suitably controlled. An example of a suitable scraped-wall, jacketed, open tank mixer is a Krueter temper kettle (Becken, pp. 183–4). In addition, it is possible to carry out the conditioning step in two or more separate pieces of agitated, heat exchanger equipment. Another mechanical devices that can be used for the continued shearing of the crystallized polyol polyester is a Ross 410 X-3 or a Readco twin screw mixer.

The continued shearing step can also be accomplished using non-mechanical mixing devices such as static mixers, consisting of a pipe section having a plurality of mixing elements contained in a series therein. Turbulence and shear are imparted to the product as it passes through stationary mixing blades within the pipe. Manufacturers of inline static mixer include Komax and Lightnin.

It is also possible to carry out both the crystallizing step and any continued shearing step in a single piece of equipment, such as, for example, in a turbo temperer such as a Sollich Turbo Tempering column.

3. Tempering

The process of the present invention can optionally include a tempering step. The tempering step comprises reducing the temperature of the crystallized polyol polyester composition to a tempering temperature that is less than the intended minimum handling and storage temperature of the flowable nondigestible oil, and holding the composition at the tempering temperature for a time sufficient for any solid polyol fatty acid polyester to substantially complete crystallizing. A tempering step can advantageously be employed when the crystallization temperature of the crystallizing step is above the intended storage temperature of the flowable nondigestible oil composition. The tempering step is usually not required when the crystallization temperature is itself below the intended storage temperature. The tempering temperature is preferably at least 5° C., more preferably at least 10° C., below the intended ambient handling/storage temperature of the flowable nondigestible oil. Typically, the tempering temperature is from about 5° C. to about 25° C., preferably about 5° C. to about 15° C.

In order to prevent the aggregation of crystallized particles during the tempering step, shear mixing should be applied to the polyol polyester composition. In general the tempering step will take from about 2 minutes to about 2 hours, preferably from about 2 minutes to about 1 hour, more preferably about 5 minutes to about 20 minutes. The amount of shearing that is typically provided in the tempering step will be substantial the same as that provided during the conditioning step, though preferably it is at least about 1 $sec^{-1}$, and preferably about 25 $sec^{-1}$ to about 50 $sec^{-1}$. As with the continued shearing, the tempering step should avoid creating any dead zones in the mixing vessel which might result in a localized stiffened composition.

Following the tempering step, the flowable polyol polyester composition is preferably raised in temperature to the ambient handling/storage temperature.

4. Diluent Addition

The process of the present invention can also optionally include a step of adding an amount of, and preferably a stabilizing amount of, a diluent liquid to the crystallized polyol polyester composition in order to form, and preferably to ensure the stability of, the flowable nondigestible oil. The principle of adding a diluent liquid is to increase incrementally the solubility of the solid polyol fatty acid polyester into the liquid polyol polyester, thereby promoting a more flowable composition. Preferably the diluent liquid is added after the crystallization temperature has been reduced to the ambient storage temperature, even more preferably after any tempering step. The addition of the diluent can reduce, and preferably stop, the driving force for solid polyol polyester in the liquid polyol polyester to crystallize out of solution, and can even result in some amount of resolubilizing of crystallized solid polyol polyester back into the liquid phase. The diluent is added in an amount, relative to the amount of the processed nondigestible oil, generally at about 10:1 to about 0.01:1, preferably about 2:1 to about 0.01:1, more preferably about 1:1 to about 0.05:1, and most preferably about 0.5:1 to about 0.1:1. The temperature of the diluent liquid at which it is added to the flowable nondigestible oil is from about 5° C. to about 50° C., more preferably about 10° C. to about 25° C. The temperature of the diluent liquid will depend upon the amount of diluent liquid used, the preferred storage temperature of the flowable nondigestible oil, and other factors that will be understood by one skilled in the art. A preferred diluent is the liquid polyol fatty acid polyester. Other diluents can be other edible oils, preferably nondigestible oils, which are miscible with the liquid polyol polyester of the flowable nondigestible composition, and are generally lipophilic.

If the flowable nondigestible oil composition is permitted to set without any circulation or stirring for an extended period of time, it is possible that minor temperature fluctuations could result in an incremental crystallization of remaining solid polyol polyester in the liquid polyol polyester, which could result in a thickening and stiffening of the composition. Application of additional shear, therefore, would serve to break up any larger aggregate particles that may have formed from the clustering of small aggregate particles, thereby reducing the Consistency of the composition.

The step of adding the diluent liquid to the crystallized polyol polyester composition can be before any continued shearing of the crystallized composition, or after any continued shearing step. The adding of the diluent liquid before the continued shearing step reduces the time needed for the continued shearing.

C. Temperature Sensitive Food Additives

The flowable nondigestible oil composition can further comprise temperature-sensitive food additives, including fat-soluble and other vitamins, flavorings, and seasonings. The food additives can be added either as a particulate or as a liquid. When adding as a particulate, the particulate food additive can be added to the final flowable nondigestible oil, or added during the crystallization of the compositions at a step where the temperature does not adversely effect the efficacy of the additive.

The present flowable nondigestible oil compositions can also be fortified with vitamins and minerals, particularly the fat-soluble vitamins. The fat-soluble vitamins include vitamin A, vitamin D, vitamin K, and vitamin E. (See U.S. Pat. No. 4,034,083 (Mattson) issued Jul. 5, 1977, incorporated by reference herein.)

D. Uses of the Nondigestible Oil Compositions

The nondigestible oils, which can be processed into the flowable nondigestible oils of the present invention, can be used in frying applications such as the preparation of French fried potatoes, potato chips, corn chips, tortilla chips, chicken, fish, and battered and fried foods (e.g. shrimp tempura). Preferably, the compositions can be used as shortenings, cooking oils, frying oils, salad oils, and popcorn oils. The compositions may also be used in cooking sprays, margarines and spreads. The individual composition components may be mixed before preparing foods or they can be added separately to the foods.

The nondigestible oils can also be used in the production of baked goods in any form, such as mixes, shelf-stable baked goods, and frozen baked goods. Possible applications include, but are not limited to, cakes, brownies, muffins, bar cookies, wafers, biscuits, pastries, pies, pie crusts, granola bars, and cookies, including sandwich cookies and chocolate chip cookies, particularly the storage-stable dual-textured cookies described in U.S. Pat. No. 4,455,333 of Hong & Brabbs. The baked goods can contain fruit, cream, or other fillings. Other baked good uses include breads and rolls, crackers, pretzels, pancakes, waffles, ice cream cones and cups, yeast-raised baked goods, pizzas and pizza crusts, and baked farinaceous snack foods, and other baked salted snacks.

The herein can also be used as a component of the fat portion of many other foods such as ice cream, frozen desserts, cheese, meats, chocolate confections, salad dressings, mayonnaise, margarine, spreads, sour cream, yogurt, coffee creamer, extruded snacks, roasted nuts and beverages, such as milk shakes.

The compositions of the present invention can be used to substitute from about 10% to 100% of the fat/oil in foods. When substituting the present compositions for fat in foods which contain fat and non-fat ingredients (e.g., starches, sugar, non-fat milk solids, etc.) the solid polyol polyesters are included to control passive oil loss of the nondigestible oil when said foods are ingested.

The compositions herein can be used in combination with other nondigestible fats, such as branched chain fatty acid triglycerides, triglycerol ethers, polycarboxylic acid esters, sucrose polyethers, neopentyl alcohol esters, silicone oils/ siloxanes, and dicarboxylic acid esters. Other partial fat replacements useful in combination with the materials herein are medium chain triglycerides, triglycerides made with combinations of medium and long chain fatty acids (like the ones described in European Application 0322027 (Seiden), published Jun. 28, 1989, incorporated herein by reference), highly esterified polyglycerol esters, acetin fats, plant sterol esters, polyoxyethylene esters, jojoba esters, mono/diglycerides of fatty acids, and mono/diglycerides of short-chain dibasic acids.

The compositions are particularly useful in combination with particular classes of food and beverage ingredients. For example, an extra calorie reduction benefit is achieved when the present flowable shortenings are used with noncaloric or reduced calorie sweeteners alone or in combination with bulking agents. Noncaloric or reduced calorie sweeteners include, but are not limited to, aspartame saccharin, alitame, thaumatin, dihydrochalcones, acesulfame and cyclamates.

Bulking or bodying agents are useful in combination with the nondigestible oil compositions herein in many food compositions. The bulking agents can be nondigestible carbohydrates, for example, polydextrose and cellulose or cellulose derivatives, such as carboxymethylcellulose, carboxyethylcellulose, hydroxypropyl methylcellulose, hydroxypropylcellulose, methyl cellulose and microcrystalline cellulose. Other suitable bulking agents include gums (hydrocolloids), starches, dextrins, fermented whey, tofu, maltodextrins, polyols, including sugar alcohols, e.g., sorbitol and mannitol, and carbohydrates, e.g., lactose.

Similarly, food and beverage compositions can be made that combine the present nondigestible oil compositions with dietary fibers to achieve the combined benefits of each. By "dietary fiber" is meant complex carbohydrates resistant to digestion by mammalian enzymes, such as the carbohydrates found in plant cell walls and seaweed, and those produced by microbial fermentation. Examples of these complex carbohydrates are brans, celluloses, hemicelluloses, pectins, gums and mucilages, seaweed extract, and biosynthetic gums. Sources of the cellulosic fiber include vegetables, fruits, seeds, cereals, and manmade fibers (for example, by bacterial synthesis). Commercial fibers such as purified plant cellulose, or cellulose flour, can also be used. Naturally occurring fibers, such as psyllium, and fibers from whole citrus peel, citrus albedo, sugar beets, citrus, pulp and vesicle solids, apples, apricots, and watermelon rinds.

These dietary fibers may be in a crude or purified form. The dietary fiber used may be of a single type (e.g., cellulose), a composite dietary fiber (e.g., citrus albedo fiber containing cellulose and pectin), or some combination of fibers (e.g., cellulose and a gum). The fibers can be processed by methods known to the art.

Of course, judgment must be exercised to make use of the present compositions and combinations thereof with other food ingredients. For example, a combination of sweetener and present flowable compositions would not be used where the specific benefits of the two are not desired. The composition and flowable composition/ingredient combinations are used where appropriate, and in appropriate amounts.

Many benefits are obtained from the use of the these nondigestible oil composition in food and beverage compositions, either when used alone or in combination with edible oils and/or other ingredients discussed above. A primary benefit is the calorie reduction achieved when nondigestible oil compositions are used as a total or partial fat replacement. This calorie reduction can be increased by using combinations of the present nondigestible oil compositions with reduced calorie sweeteners, bulking agents, or other nondigestible fats and oils. Another benefit which follows from this use is a decrease in the total amount of digestible fats in the diet. Furthermore, a significant reduction in saturated fat consumption can be achieved by substituting the present nondigestible oil compositions for saturated fats in the diet. Foods or beverages made with the nondigestible solid fat materials instead of animal-derived triglyceride fats will also contain less cholesterol, and the ingestion of these foods can lead to reduced serum cholesterol and thus reduced risk of heart disease. Also, compositions made with these fat materials have acceptable organoleptic properties, particularly lack of waxiness.

Dietary foods can be made with the nondigestible oil compositions to meet special dietary needs, for example, of persons who are obese, diabetic, or hypercholesterolemic. The present compositions can be a major part of a low-fat, low-calorie, low-cholesterol diet, and they can be used alone or in combination with drug therapy or other therapy. Combinations of food or beverage products made with the present nondigestible oil compositions can be used as part of a total dietary management regimen, based on one or more of these products, containing the fat materials alone or in combination with one or more of the above-mentioned ingredients, to provide one or more of the above-mentioned benefits.

This discussion of the present nondigestible oil composition uses, combinations, and benefits is not intended to be limiting or all-inclusive. It is contemplated that other similar uses and benefits can be found that will fall within the spirit and scope of this invention.

In addition to food compositions, the flowable or non-flowable nondigestible oil compositions of the present invention can be used in formulating lubricants, skin creams, pharmaceuticals, cosmetics, and the like.

The invention will be illustrated by the examples which follow the analytical methods.

E. Processing of Flowable Nondigestible Oil into Food and Beverage Products

The present flowable compositions are useful in the preparation of a wide variety of food and beverage products. Because of the processing steps in the present invention, the resulting flowable nondigestible oil composition, if consumed in its form directly or in foods containing the flowable nondigestible oil, may have relatively poor passive oil loss control. Consequently, it is important first to completely melt the flowable nondigestible oil to a completely molten nondigestible oil, such that the crystallized solid polyol fatty acid polyester is substantially completely melted. Preferably, the flowable nondigestible oil is melted up to a temperature of about 10° C. or more above the complete melt point of the solid polyol fatty acid polyester. The molten nondigestible oil can then be processed into food and beverage compositions in a manner that provides sufficiently rapid cooling of the nondigestible oil in a substantially quiescent state (that is, without applying shear during the crystallization) to yield a solid polyol polyester crystalline structure that provides good passive oil loss control.

Alternatively, the flowable nondigestible oil can be applied into the food-making process directly, so long as the processing results in a substantially complete melting of the solid polyol fatty acid polyester, and subsequent rapid cooling of the molten nondigestible oil to provide the good passive oil loss control. An example of such a process is spraying of the flowable nondigestible oil onto the surface of a snack food just after frying or baking. Because the snack food is still hot, the flowable nondigestible oil will be substantially completely melted, including the solid polyol fatty acid polyester thereof, and will subsequently crystallize into a form displaying passive oil loss control as the snack food cools rapidly.

When the flowable nondigestible oil composition comprises a temperature sensitive food additive, such as a vitamin, then it is important that the time during which the nondigestible oil composition is in its re-melted state should be kept to a minimum to avoid loss of efficacy of the vitamin.

F. Analytical Methods (a). Solid Fat Content

Before determining Solid Fat Content (SFC) values, a sample of the flowable composition or mixture of nondigestible liquid/solid is heated to a temperature of 140° F. (60° C.) or higher for at least 30 minutes or until the sample is completely melted. The melted sample is then tempered as follows: at 80° F. (26.7° C.) for 15 minutes; at 32° F. (0° C.) for 15 minutes; at 80° F. (26.7° C.) for 30 minutes; and at 32° F. (0° C.) for 15 minutes. After tempering, the SFC values of the sample at temperatures of 50° F. (10° C.), 70° F. (21.1° C.), 80° F. (26.7° C.), 92° F. (33.3° C.) and 98.6° F. (37° C.), can be determined by pulsed nuclear magnetic resonance (PNMR) after equilibration for 30 minutes at each temperature. The method for determining SFC values by PNMR is described in Madison and Hill, *J. Amer. Oil Chem. Soc.*, Vol. 55 (1978), pp. 328–31 (herein incorporated by reference). Measurement of SFC by PNMR is also described in A.O.C.S. Official Method Cd. 16–81, *Official Methods and Recommended Practices of The American Oil Chemists Society*, 3rd. Ed., 1987 (herein incorporated by reference).

The slope of the SFC profile is calculated by subtracting the percent solids at 70° F. from the percent solids at 98.6° F. and dividing that value by 28.6.

(b). Consistency

The Consistency (K) of the nondigestible oil is measured at a temperature between 20 and 40° C. using a Rheometrics controlled stress rheometer equipped with a cone and plate measuring system. The cone diameter is 4 cm and the cone angle is 2 degrees. A sample of the nondigestible oil is carefully applied to the plate and the cone is then slowly lowered onto the sample (gap=0.048 mm). A flow measurement is performed via the programmed application of a shear stress over time. The shear stress is increased from zero to 5,000 dynes/cm$^2$ over a 2 minutes time span. The applied stress results in deformation of the sample (i.e., strain) and the rate of strain is reported as a shear rate. These data are used to create a flow curve of log [apparent viscosity] versus log [shear rate] for the nondigestible oil sample. The flow curve is then modeled according to the following power law model:

$$\text{Apparent Viscosity} = K (\text{Shear Rate})^{n-1}$$

where the apparent viscosity is expressed in units of poise (P), shear rate is in units of 1/sec, K is the Consistency in units of P.sec$^{(n-1)}$, and n is the shear index (dimensionless). The power law model/ms widely used to describe the flow behavior of non-newtonian materials. On the log-log plot of apparent viscosity versus shear rate, the power law model is a straight line with slope of (n−1). The shear index (n) varies from 0 to 1. The closer n is to 1, the closer the material's flow behavior is to newtonian behavior. The Consistency (K) is numerically equal to the apparent viscosity at a shear rate of 1 sec$^{-1}$. The values of K and n describe the flow behavior of the nondigestible oil within specific limits of shear.

(c). Crystallization Onset Temperature

The crystallization onset temperature is that temperature at which, under the conditions of this test, turbidity is induced in the sample within 90 minutes after reaching and maintaining the crystallization onset temperature. Turbidity is caused by the first stage of crystallization. Apparatus:

1. Jacketed, agitated, cylindrical glass flask, 4 inches in diameter, at least 250 ml volume. Heating and cooling are accomplished by circulation of a clear, uncolored fluid through the jacket. Acceptable jacket fluids are, but are not limited to, water, ethylene glycol, or silicone fluids.
2. Thermometer, calibrated in the range 25° C. to 100° C.

Procedure:
1. In the flask, heat at least 250 ml of sample (but not more than 700 ml) to 85° C. and hold until all solids have dissolved. Before proceeding, the solution must be clear, without any turbidity.
2. Agitate to maintain uniform temperature throughout the flask.
3. Cool at no more than 2.5° C./min to a temperature in the vicinity of the crystallization onset temperature. Note: To prevent crystallization on the vessel walls during cooling, the jacket temperature should never be any colder than 5° C. below the sample temperature.
4. Hold at this temperature for 90 minutes or until the clear solution shows (by viewing horizontally through the vessel wall) the first hint of turbidity.
5. If the solution becomes turbid within 90 minutes, repeat by heating and redissolving the sample as in step 1. Repeat steps 2, 3, and 4, except cool to a temperature 2° C. above the previous measurement.
6. Repeat until the solution does not become turbid within 90 minutes of reaching the test temperature. The crystallization onset temperature is the highest temperature at which the solution becomes turbid within 90 minutes.
7. If, on the first measurement, after 90 minutes the solution remains clear, repeat by heating and re-dissolving the sample as in step 1. Repeat steps 2, 3, and 4, except cool to a temperature 2° C. below the previous measurement. The crystallization onset temperature is the highest temperature at which the solution becomes turbid within 90 minutes.

(d). Fatty Acid Composition of Polyol Polyesters

The fatty acid composition (FAC) of the polyol polyesters is determined by gas chromatography, using a Hewlett-Packard Model S712A gas chromatograph equipped with a flame ionization detector and a Hewlett-Packard Model 17671A automatic sampler. The chromatographic method used is described in *Official Methods and Recommended Practices of the American Oil Chemists Society*, 3rd Ed., 1984, Procedure 1-Ce62 (incorporated herein by reference).

(e). Ester Distribution of Sucrose Polyesters

The relative distribution of the individual octa-, hepta-, hexa- and penta- esters, as well as collectively the tetra- through mono-esters, of the sucrose polyesters can be determined using normal-phase high performance liquid chromatography (HPLC). A silica gel-packed column is used in this method to separate the polyester sample into the respective ester groupings noted above. Hexane and methyl-t-butyl ether are used as the mobile phase solvents. The ester groupings are quantitated using a mass detector (i.e. an evaporative light-scattering detector). The detector response is measured and then normalized to 100%. The individual ester groups are expressed as a relative percentage.

(f). Complete Melt Point

Equipment:

Perkin-Elmer 7 Series Thermal Analysis System, Model DSC7, manufactured by Perkin-Elmer, Norwalk, Conn.

Procedure:
1) Sample of polyol polyester is heated to at least 10° C. above the temperature at which all visible solids are melted, and mixed thoroughly.
2) 10±2 mg. of sample is weighed into sample pan.
3) A scan is performed from about 10° C. above the temperature at which all visible solids are melted, to −60° C. at 5° C. per minute.
4) The temperature of the sample is maintained at −60° C. for 3 minutes and scanned from −60° C. to the original starting temperature at 5° C. per minute (i.e. about 10° C. above the temperature at which all visible solids are melted).
5) The complete melting point is the temperature at the intersection of the baseline (i.e., specific heat line) with the line tangent to the trailing edge of the last (highest temperature) endothermic peak.

(g). Thickness of Solid Polyol Fatty Acid Polyester Particles (Light Microscopy)

The thickness of the solid polyol polyester particles formed in the flowable nondigestible oil compositions herein may estimated at room temperature with a Nikon Microphot video-enhanced light microscope (VELM) using Hoffman Modulation Contrast (HMC) optics according to the following method:
1. A small portion (i.e., 1–10 mg) of the nondigestible oil sample with the solid polyol fatty acid polyester particles dispersed therein is placed on a microscope slide and covered. The slide is placed under the microscope.
2. The sample is examined using a HMC 100× oil objective as the standard lens in conjunction with a 10× eyepiece lens.
3. A microscope-mounted video camera and associated controller are used for video enhancement to facilitate differentiation between the sample and the background.
4. The thickness of the solid polyol fatty acid polyester particles is measured in um (microns).

This method permits differentiation of particles having thicknesses just within the resolution of the VELM (approximately 0.2–0.5 um). Particle thickness of particles having smaller dimensions can be determined by the Freeze Fracture Method described hereinafter.

(Note: No special sample preparation is required, other than obtaining a representative sample. The samples should be melted and cooled ambiently.) Reference: Robert Hoffman, "The Modulation Contrast Microscope: Principles and Performances", Journal of Microscopy, Vol. 110, Pt 3, August 1977, pp. 205–222.

(h). Thickness of Solid Polyol Fatty Acid Polyester Particles (Freeze Fracture Transmission Electron Microscopy)

The three-dimensional topography of particles of polyol fatty acid polyesters and their size can be determined by a freeze-fracture transmission electron microscopy (ff-tem) method.

This freeze-fracture method is carried out as follows:
1. The outside cavity of a freezing container is filled with liquid $N_2$ and the inner dewar of the freezing container is filled with liquid ethane (normal melting temperature of −172° C. ). The ethane is allowed to freeze.
2. A small amount (1–2 ul) of the nondigestible fat sample with the solid polyol fatty acid polyester particles dispersed therein is placed in the well of a gold-plated Balzers specimen holder. (Note: for very fluid samples, 1–2 ul of sample is placed on a gold planchet (Balzers) and another planchet is placed on top of the first to form a sandwich.)
3. Most of the frozen ethane in the dewar is melted by inserting a metal heat sink into the dewar.
4. Immediately after melting the ethane, the specimen holder containing the nondigestible fat sample is picked up using a pair of tweezers and rapidly plunged into the liquid ethane.
5. After a few seconds, the specimen holder is removed from the ethane, quickly touched to the tip of a camel's hair brush to remove excess ethane, and immediately immersed in the liquid $N_2$ to keep the sample cold.
6. The sample is transferred under liquid $N^2$ to a JEOL JFD-9000C sample holder and then transferred into the chamber of a JEOL JFD-9000C freeze-fracture unit. The temperature of the unit should be about −175° C. Vacuum should be at least $8 \times 10^{-7}$ torr.

7. A knife is cooled to a temperature of about −165° C.
8. The sample is fractured in the JEOL chamber using the pre-cooled knife.
9. Platinum-carbon is deposited onto the fractured sample at a 45° angle for 4.5 seconds, followed by carbon deposition at a 90° angle for 25 seconds to form a replica of the fractured sample. The high voltage is 2500V and the current is 70 mA.
10. The samples are removed from the freeze fracture unit and cleaned using 3 washes of chloroform.
11. The replica is picked up on a 300 mesh copper EM grid and examined in a transmission electron microscope.
12. Images are recorded on negative film and positive prints are made from the negatives.
13. The thickness of the polyol fatty acid polyester particles is measured in nm.

References:
Rash, J. E. and Hudson, C. S., *Freeze Fracture: Methods. Artifacts, and Interpretations*, New Haven Press, New York, 1979.
Stolinski and Breathnach, *Freeze Fracture Replication of Biological Tissues*, Academic Press, London, 1975.
Steinbrecht and Zierold, *Cryotechniques in Biological Electron Microscopy*, Springer-Verlag, Berlin, 1987.

Specific Examples

Preparation of flowable nondigestible fat compositions of the present invention is illustrated by the following examples.

Example 1

A solid sucrose polyester and a liquid sucrose polyester, having fatty acid compositions and ester distributions typical of those shown in Table C for the product Olean® manufactured by The Procter & Gamble Company, Cincinnati, Ohio, are mixed at a proportion of 6 weight parts of the solid sucrose polyester to 94 weight parts of the liquid sucrose polyester, and agitated to a molten liquid state at a temperature of 68° C. in a temperature controlled agitated vessel. This molten mixture is then pumped at a flow rate of 280 pounds per hour (127.3 kg/hr) through two serially-arranged brine-jacketed (−1.0° C. brine coolant) Cherry Burrell Votator Model 3SSHE scrapped wall heat exchangers, operating at 1690 RPM. The temperature of the mixture is lowered from 68° C. to 21° C. within a residence time of 20 seconds. Upon exiting the Cherry Burrell heat exchangers, the solid sucrose polyester portion is substantially crystallized and forms small (<10 micron) discrete and unaggregated crystal particles. The substantially crystallized composition is then passed through a heat exchanger which adjusts the temperature (as needed) to 21° C., and into a jacketed scraped wall tank where it is held under continued shearing for two hour at 21° C. The batch tempering tank is 12 inches in diameter and 28 inches deep, holds 100 pounds (45.5 kg) of the composition, and is equipped with an anchor-type agitator which turns at 14 rpm; there are no dead spots in the material in the vessel.

The resulting flowable nondigestible oil product has the following physical attributes:

heat exchanger outlet and continued shearing hold temperature: 21° C.
shear index: n=0.6
Consistency (70° F.):60 P.sec$^{(n-1)}$ Example 2

The Example #1 is repeated, except for changes in the scraped wall heat exchanger outlet temperature, as shown in Table A.

TABLE A

| Scraped wall heat exchanger outlet temperature | 15.5° C. | 21° C. | 26.7° C. | 39.4° C. |
|---|---|---|---|---|
| Consistency (K) | 63 | 60 | 60 | 63 |
| shear index (n) | 0.6 | 0.6 | 0.7 | 0.5 |

Example 3

The Example #1 is repeated, except for changes in the tempering time and the scraped wall heat exchanger outlet temperature, as shown in Table B.

TABLE B

| Scraped wall heat exchanger outlet temperature | Continued shearing time, minutes | Consistency (K) | shear index (n) |
|---|---|---|---|
| 21° C. | 30 | 90 | 0.5 |
|  | 60 | 80 | 0.6 |
|  | 120 | 62 | 0.6 |
| 15.6° C. | 30 | 75 | 0.6 |
|  | 60 | 75 | 0.6 |
|  | 120 | 67 | 0.6 |

TABLE C

Fatty Acid Composition and Ester Distribution of the Solid Sucrose Polyester and the Liquid Sucrose Polyester Components of Olean®

| Fatty Acid Component | Solid Sucrose Polyester (weight %) | Liquid Sucrose Polyester (weight %) |
|---|---|---|
| C8 | — | — |
| C10 | — | — |
| C12 | 0 | — |
| C14 | 0 | — |
| C16 | 1.2 | 9.7 |
| C17 | 0 | 0.1 |
| C18 | 4.6 | 5.9 |
| C18:1 | 3.7 | 64.5 |
| C18:2 | 10.9 | 18.9 |
| C18:3 | 0 | 0.2 |
| C20 | 4.6 | 0.3 |
| C22 | 71.7 | 0.2 |
| C22:1 | 0.2 | — |
| C24 | 2.8 | — |
| Other | 0.4 | 0.2 |
| Ester Distribution. | % | % |
| Octa | 71.6 | 78.7 |
| Hepta | 28.2 | 21.0 |
| Hexa | 0.2 | 0.2 |
| Penta | <0.1 | 0.2 |
| Lower | <0.1 | 0.1 |

What is claimed is:

1. A process for making a flowable nondigestible oil composition comprising a liquid polyol fatty acid polyester having a complete melt point less than 37° C., and a solid polyol fatty acid polyester having a complete melt point of at least about 37° C., the process comprising the steps of:

a) melting the nondigestible oil comprising the solid polyol fatty acid polyester and the liquid polyol fatty acid polyester, b) crystallizing at least a substantial portion of the solid polyol fatty acid polyester, wherein said crystallizing further comprises continued holding the crystallized composition at a crystallization temperature whereby the crystallization of the solid polyol fatty acid polyester is substantially complete, and further wherein the crystallization temperature is about 5° C. or more below the onset crystallization temperatures of the solid polyol fatty acid polyester, and c) shearing the nondigestible oil composition during the step of crystallizing, thereby forming the solid polyol fatty acid polyester into crystallized particles, wherein the flowable nondigestible oil has a Consistency in a temperature range of 20° to 40° C. of less than about 600 $P.sec^{(n-1)}$.

2. The process according to claim 1 wherein the step b) of crystallizing comprises the steps of:

i) reducing the temperature of the melted nondigestible oil to a crystallization temperature less than the onset crystallization temperature of the solid polyol fatty acid polyester, and ii) holding the nondigestible oil at the crystallization temperature for a time sufficient to crystallize at least a substantial portion of the solid polyol fatty acid polyester.

3. The process according to claim 1 wherein the shearing step c) further comprises continued shearing of the composition during the continued holding step.

4. The process according to claim 1 wherein the flowable nondigestible oil composition has a Consistency in a temperature range of 20°–40° C. of less than about 400 $P.sec^{(n-1)}$.

5. The process according to claim 4 wherein the Consistency in a temperature range of 20°–40° C. is less than about 200 $P.sec^{(n-1)}$.

6. The process according to claim 5 wherein the Consistency in a temperature range of 20°–40 C. is less than about 100 $P.sec^{(n-1)}$.

7. The process according to claim 1 wherein the solid polyol fatty acid polyester has a complete melt point of at least 60° C.

8. The process according to claim 7 wherein the solid polyol fatty acid polyester is selected from the group consisting of (i) a solid saturated polyol polyester, (ii) a solid diversely esterified polyol polyester, (iii) a polyol polyester polymer, and (iv) combinations thereof.

9. The process according to claim 8 wherein the solid polyol fatty acid polyester comprises a solid saturated polyol polyester comprising octa-behenate sucrose polyester, and a solid diversely esterified polyol polyester comprising octa-saturated sucrose polyester wherein the esters are selected from behenate and a mixture of C8:1 and C18:2 unsaturate.

10. The process according to claim 1 wherein the crystallized particles of solid polyol fatty acid polyester have a maximum dimension of about 1 micron to about 30 microns.

11. The process according to claim 1 wherein in step b) at least 80% of the solid polyol fatty acid polyester is crystallized.

12. The process according to claim 11 wherein in step b) at least 95% of the solid polyol fatty acid polyester is crystallized.

13. The process according to claim 11 wherein the step of crystallizing the solid polyol fatty acid polyester is at a crystallizing temperature of at least about 10° C. below the onset crystallization temperature of the solid polyol fatty acid polyester.

14. The process according to claim 13 wherein the step b) of crystallizing comprises cooling the composition from the molten temperature to the crystallization temperature at a cooling rate of about 100–300° C./min.

15. The process according to claim 14 wherein step b) is completed within about 30 seconds.

16. The process according to claim 15 wherein step c) comprises shearing the crystallizing composition at a shear rate of about 400 $sec^{-1}$ to about 8000 $sec^{-1}$.

17. The process according to claim 6 wherein a diluting amount of the liquid polyol polyester is added to the crystallized composition in a ratio of from about 0.5:1 to about 0.1:1.

18. The process according to claim 17 wherein the steps b) of crystallizing and step c) of shearing are both conducted in a scraped wall heat exchanger or equivalent.

19. The process according to claim 1 further comprising the step of tempering the flowable nondigestible oil composition by reducing the temperature to the composition to a tempering temperature which is below an intended storage temperature, and shearing the tempering composition.

20. The process according to claim 1, further comprising the step of adding a stabilizing amount of a diluent liquid after the step b) of crystallizing the solid polyol fatty acid polyester.

* * * * *